United States Patent Office 3,515,793
Patented June 2, 1970

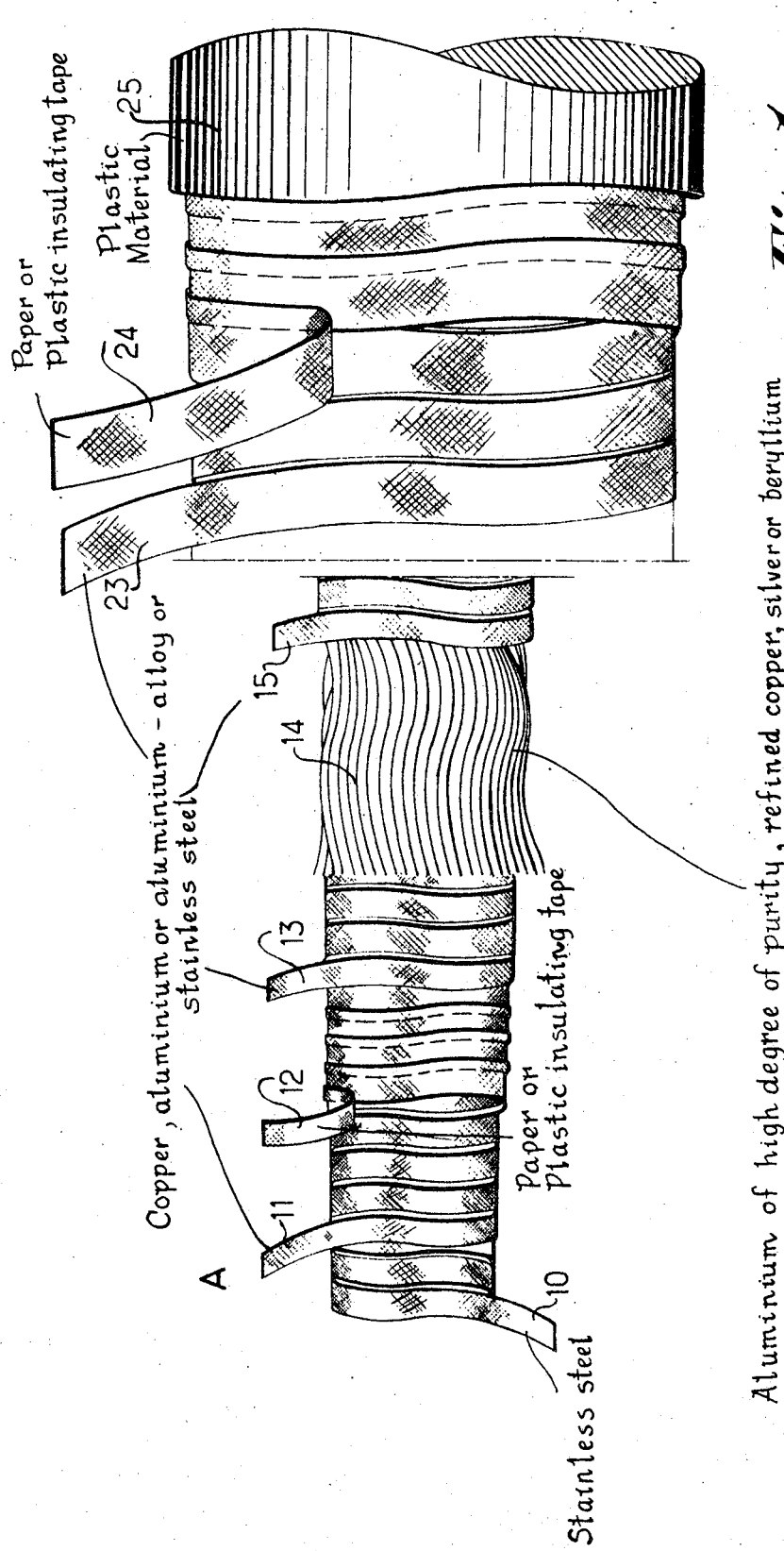

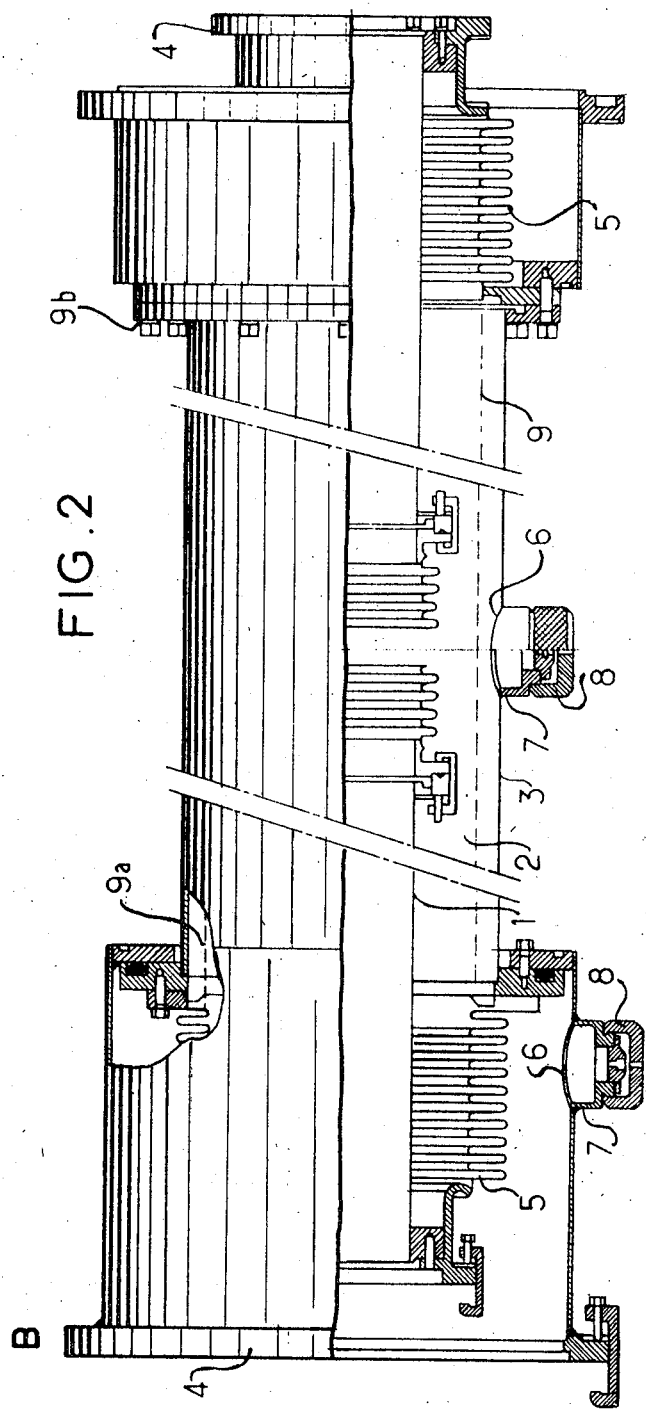

3,515,793
CRYOGENIC POLYPHASE CABLE
Marcel Aupoix, Paris, and François Moisson-Franck-hauser, Bretigny-sur-Orge, France, assignors to Compagnie Generale d'Electricite, Paris, France, a corporation of France
Filed Dec. 29, 1967, Ser. No. 694,680
Claims priority, application France, Dec. 29, 1966, 89,367
Int. Cl. H02g 15/26; H01b 7/34
U.S. Cl. 174—13                     13 Claims

ABSTRACT OF THE DISCLOSURE

A polyphase cryogenic cable including an outer part comprising first and second concentric members joined together by expandable means and an inner current-carrying part wherein each current phase assembly comprises a conductive layer positioned between wound layers of metal tape, the conductive layers being in the form of wires or conductors having a wavy configuration or having spaced folded portions capable of absorbing changes in length of the conductors due to temperature changes.

---

The present invention relates to a cryogenic polyphase cable capable of carrying great electrical energies. This cable may be of the so-called "hyper-conductive" or "super-conductive" type.

The term hyper-conductive is applied to a cable whose active part conducting the electric current, comprises conductors made of metal of a high degree of purity whose electrical resistance is reduced considerably when their temperature is lowered, for example, to approximately 20° Kelvin in the case of aluminum conductors, and to approximately 70° Kelvin in the case of beryllium conductors.

The term super-conductive is applied to cables whose active part conducting the electric current, comprises conductors made of metal of super-conductive properties, whose resistance is reduced substantially to zero when their temperature is lowered to a very low level, for example to approximately 4° Kelvin in the case of columbium-zirconium of columbium-titanium conductors, and to approximately 18° Kelvin in the case of columbium-tin conductors. Numerous cables of the hyper-conductive or super-conductive type have already been produced.

Cables of this nature comprise an "electrical" part conducting the current, a device for cooling the said electrical part by circulation of a cryogenic fluid, and a thermal insulation device intended to reduce heat exchange between the cooling device and the surroundings to the lowest possible value.

As in the case of conventional cables, the hyperconductive or super-conductive conductors of the "electrical" part of cryogenic cables are equipped with insulating layers intended, on the one hand to provide insulation between the different phases of the cable, and on the other hand to provide electrical insulation of the different phases from the grounded surroundings. One of the principal difficulties encountered in producing a cryogenic cable results from the stresses and strains exerted on its different component parts during cooling to engender a change from ambient temperature to operating temperature, which stresses and strains are caused by the difference in the values of the coefficients of expansion of the materials of the said parts.

These stresses and strains have the result of breaking the electrical or thermal insulation and of causing short-circuits between phases or the grounding of one or more phases, or heat losses causing the cable to be heated, so that the latter loses its hyper-conductive or super-conductive properties.

It is an object of the present invention to find a structure for a cryogenic cable such that the different coefficients of expansion of the different parts of the cable do not cause any strains between these different parts during cooling or during the change from the operating temperature of the cable to ambient temperature. This cable may then be buried without risk of failure.

Another object of the invention is to provide a structure for a cryogenic cable such that the latter may be produced easily in sections of great length with satisfactory pliability such that it may easily be wound and carried on a drum.

The cryogenic cable according to the invention is essentially characterized in that it comprises an active part employed to carry current, organised in such manner as to retain a fixed position and constant length irrespective of temperature variations, and an outer part surrounding the active part and acting as a duct for the cryogenic fluid and as a heat insulator.

In a preferred embodiment of the invention, the conductors of each phase consist of sinuous parallel wires laid around a cylindrical surface.

In a modified form, the conductors of each phase are formed by at least one metal strip of serpentine configuration comprising contricted areas of deformation, and bent around a cylindrical surface. Conductors of this nature have already been described in applicants' copending application Ser. No. 694,146, filed Dec. 28, 1967, entitled "Electrical Conductor Configuration Providing Length Stable With Temperature."

The conductors of each phase are separated from the insulating layers by means of metal strips, tapes or fails of thin gauge. The core of the cable may consist of metal sheet of satisfactory mechanical strength wound helically with the turns almost touching each other. In a modified form, the core consists of a clipped tube or the like.

The invention will now be described with reference to the accompanying drawings which illustrate the invention, but in no restrictive sense.

FIG. 1 illustrates an elevational view of the active portion A of a three-phase cryogenic cable, and FIG. 2 illustrates its outer casing B.

The cable comprises two separate parts, which are not connected mechanically, being an inner or active part A carrying the current, and an outer part B acting as a cooling duct and as a heat insulator with cooling fluid transversing the space between. One of the features of the invention is that the two parts may be constructed and installed separately. When laying the cable according to the invention, the part B will preferably be buried.

The internal part A of the cable as seen in FIG. 1 internally comprises a core consisting of metal strip 10 wound in a spiral with the turns almost touching each other. The metal chosen will preferably possess satisfactory mechanical strength, for example, stainless steel. The ratio between the width of the strip and its thickness will preferably amount to between 4 and 7 to 1.

The metal strip is covered by a metal tape 11 wound with opposite pitch to that of the strip 10 and possessing a thickness such that the ratio between its width and its thickness preferably amounts to between 40 and 70 to 1, its width advantageously being identical to that of the strip 10. The metal for the tape 11 is preferably chosen from copper, aluminum, duraluminum and stainless steel.

The metal tape 11 is covered by one or more layers of electrical insulation, preferably produced by winding on semi-overlapping turns of insulating tape 12, such as, paper tape or plastic insulating tape such as nylon or the like, or formed by a plurality of layers of plastic produced by extrusion.

Above this insulating layer is situated a wound layer of metal tape 13 identical to the tape 11. Over the tape 13 is situated a sheet 14 of filiform conductors intended to carry one phase of the current, being the phase I for example. Over the sheet of filiform conductors is situated a wound layer of metal tape 15 identical to the tape 11, 13. In the "hyper-conductive" form of this cable, the conductors may be of aluminum of high degree of purity, of refined copper, of silver or of beryllium. In the "super-conductive" form of this cable, the conductors may for example consist of aluminum wires coated with a plating of lead, columbium, columbium-zirconium or niobium-titanium or niobium-tin alloy.

The wires of this sheet extend parallel but not rectilinear. Before they are placed in position, they are given a wavy form approximating a sinusoidal curve whose axis is parallel to the generatrixes of the cylinder formed by the layer 13 and the plane of this sinusoidal curve is bent so that the wires are in contact with the cylindrical layer 13.

The following elements (not specifically shown) are then positioned successively from the inside towards the outside of the cable above the layer of conductors 14; a wound layer of metal tape identical to the tape 11, an electrical insulation of the same kind as the insulation 12, a wound layer of metal tape identical to the layer of tape 13, a sheet or layer of wires identical to the sheet or layer 14 intended to carry the current of phase II, a wound layer of metal tape identical to the tapes 11, an electrical insulation identical to insulation 12, a wound layer of metal tape identical to metal tape 11, a sheet or layer of wires identical to wires 14 and intended to carry the current of phase III, a wound layer of metal tape 23, an electrical insulation in the form of wound insulating tape 24, and a sheath 25 of plastic material, which prevents penetration of moisture into the cable before it is inserted into the sheath B and protects the cable during transport or storage and during laying. This sheath may contingently be stripped off before placing the cable in position. It should be apparent that the assembly of elements associated with each phase of the current carried by the cable is identical; therefore, only one such assembly has been specifically illustrated in the drawing.

The function of the wound layers of metal tape such as tape 11 is to allow satisfactory sliding of the conductive layers of electrical insulation, when contractions occur during cooling or expansions when the temperature of the cable rises from its operating level to ambient temperature. They render it possible to reduce the stresses on the conductors and to prevent strain-hardening of their metal. The wavy outlines imparted to the wires forming the phase conductors become straightened on cooling by the normal action of metal contraction. The reverse action occurs when the cable warms up again, and the wavy outlines resume their initial amplitude.

The helix 10 can also expand and contract freely with temperature variations. Thanks to the unimpeded action of the contractions and expansions of the different metals comprises therein, and thanks to its structure comprising helical layers and wavy layers, the cable according to the invention possesses the feature of retaining practically constant length when the temperature varies, without the appearance of harmful stresses between the different layers which slide freely on each other.

In a modified embodiment the layers or sheets of wires are replaced by conductors in the form of a strip bent to trough-shape possessing areas of local deformation in such manner as to retain a constant length irrespective of the temperature. Conductors of this nature, and the metals of which they may be formed, have been described in the patent application hereinbefore cited.

In this modified form the incorporation of wound metal tape layers also proves appropriate to permit free contraction of the conductors during application of cooling fluid.

The outer part B of the cable essentially comprises an internal tube 1, preferably made of a metal of satisfactory mechanical strength for example, of normal steel or of stainless steel. Around this tube is situated a thermal super-insulation 2, which may for example consist of metallized plastic sheets between which a vacuum is established. An external tube 3 of steel or stainless steel is arranged concentrically to the tube 1, in such manner as to form a hermetic enclosure with the latter.

Each section of the outer part of the cable carries circular flanges 4 and 4' on the extremities of the external tube 3 and the internal tube 1, respectively, intended to form a sealed compartment with the tubes 1 and 3 of other sections. The tube 1 is connected to the flange 4 by metal bellows 5 intended to take up the differences in length between the tube 1 which is to be at low temperature during operation, and the tube 3 which remains at ambient temperature. The outer tube 3 comprises orifices 6 enclosed in a tube 7 closed off by a valve 8 so that the said super-insulation may be pumped free of air.

The heat insulation is preferably comprised between two screens 9 and 9a intended to form ducts with the tubes 1 and 3 to allow a vacuum to be established in the heat insulation.

The outer tube 3 may receive a protective mechanical and anti-corrosive coating which is not shown, by any known means. Bearers for example, being provided in the form of recessed rings 9b, additionally hold the tubes 1 and 3 in spaced apart relationship to each other, in such a manner as to prevent the squashing of the layers of heat insulation.

The cryogenic fluid flows within the helix 10 in the inner part B of the cable and in the annular space 26 extending between the sheath 25 and the tube 1.

We have shown and described two embodiments in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are encompassed by the scope of the appended claims.

We claim:

1. A cryogenic polyphase cable comprising an outer element including two concentric tubular metal members between which is provided a thermal super-insulation and expandable elements interconnecting said tubular metal members, and an inner current-carrying element positioned within the inner tubular metal member of the outer element and including a plurality of co-axial tubular conductive layers, each conductive layer being positioned between two wound layers of metal tape, a layer of insulating material interposed between adjacent layers of metal tape associated with adjacent conductive layers, and a metal tube positioned coaxially to said conductive layers and serving as a duct for carrying a cryogenic fluid, said current-carrying element having a configuration which provides for substantially constant conductor length with change in temperature.

2. A cryogenic polyphase cable as defined in claim 1 wherein each tubular conductive layer comprises at least one layer of metal wires extending substantially parallel to the axis of the cable and having a wavy pattern on the surface formed by a layer of metal tape.

3. A cryogenic polyphase cable as defined in claim 1 wherein each tubular conductive layer includes at least one metal strip extending substantially parallel to the axis of the cable and being provided with bending areas in the form of folded portions formed at a plurality of spaced points along said strip.

4. A cryogenic polyphase cable as defined in claim 1 in which the material for the conductive layers is a metal selected from the group consisting of high-purity aluminum, electrolytic copper, beryllium and silver.

5. A cryogenic polyphase cable as defined in claim 1 in which the material for the conductive layers is a metal selected from the group consisting of lead, columbium, a colubium-zirconium alloy, a columbium-titanium alloy and a columbium-tin alloy.

6. A cryogenic polyphase cable as defined in claim 1 in which the material for the wound layers of metal tape is a metal selected from the group consisting of copper, duraluminum, stainless steel and aluminum.

7. A cryogenic polyphase cable as defined in claim 1 in which said metal tube is formed by a strip of metal of high mechanical strength wound helically with the turns slightly spaced from each other.

8. A cryogenic polyphase cable as defined in claim 1 further including cryogenic fluid flowing in the space extending between said inner current-carrying element and said inner tubular metal member of the outer element.

9. A cryogenic polyphase cable as defined in claim 1 in which said metal tube is formed of a clipped steel tube.

10. A cryogenic polyphase cable as defined in claim 1 wherein said expandable elements are provided in the form of metal bellows.

11. A cryogenic polyphase cable as defined in claim 7 wherein the ratio of the width of said strip of metal to its thickness is between 4 and 7 to 1.

12. A cryogenic polyphase cable as defined in claim 7 wherein said metal tape is wound with opposite pitch to that of said strip of metal and has a ratio of width to thickness of between 40 to 70 to 1.

13. A cryogenic polyphase cable as defined in claim 10 wherein the width of said metal tape is equal to the width of said strip of metal.

References Cited

UNITED STATES PATENTS

| | | | |
|---|---|---|---|
| 3,022,368 | 2/1962 | Miller | 174—15 |
| 2,099,407 | 11/1937 | Mildner | 174—13 |
| 3,301,937 | 1/1967 | Burnier et al. | 174—15 |
| 3,292,016 | 12/1966 | Kafka | 174—15 X |
| 3,414,662 | 12/1968 | Klein et al. | 174—15 |
| 2,976,343 | 3/1961 | Lansch | 174—12 X |
| 2,531,917 | 11/1950 | Mollerhoj et al. | 174—13 |

FOREIGN PATENTS

| | | |
|---|---|---|
| 3,819,229 | 9/1963 | Japan. |
| 858,102 | 11/1940 | France. |
| 706,969 | 3/1965 | Canada. |
| 1,463,138 | 11/1966 | France. |

OTHER REFERENCES

German Printed Application, Siemens & Halske Aktiengesellschaft, 1,218,628, June 8, 1966.

LEWIS H. MYERS, Primary Examiner

A. T. GRIMLEY, Assistant Examiner

U.S. Cl. X.R.

174—15, 108